UNITED STATES PATENT OFFICE.

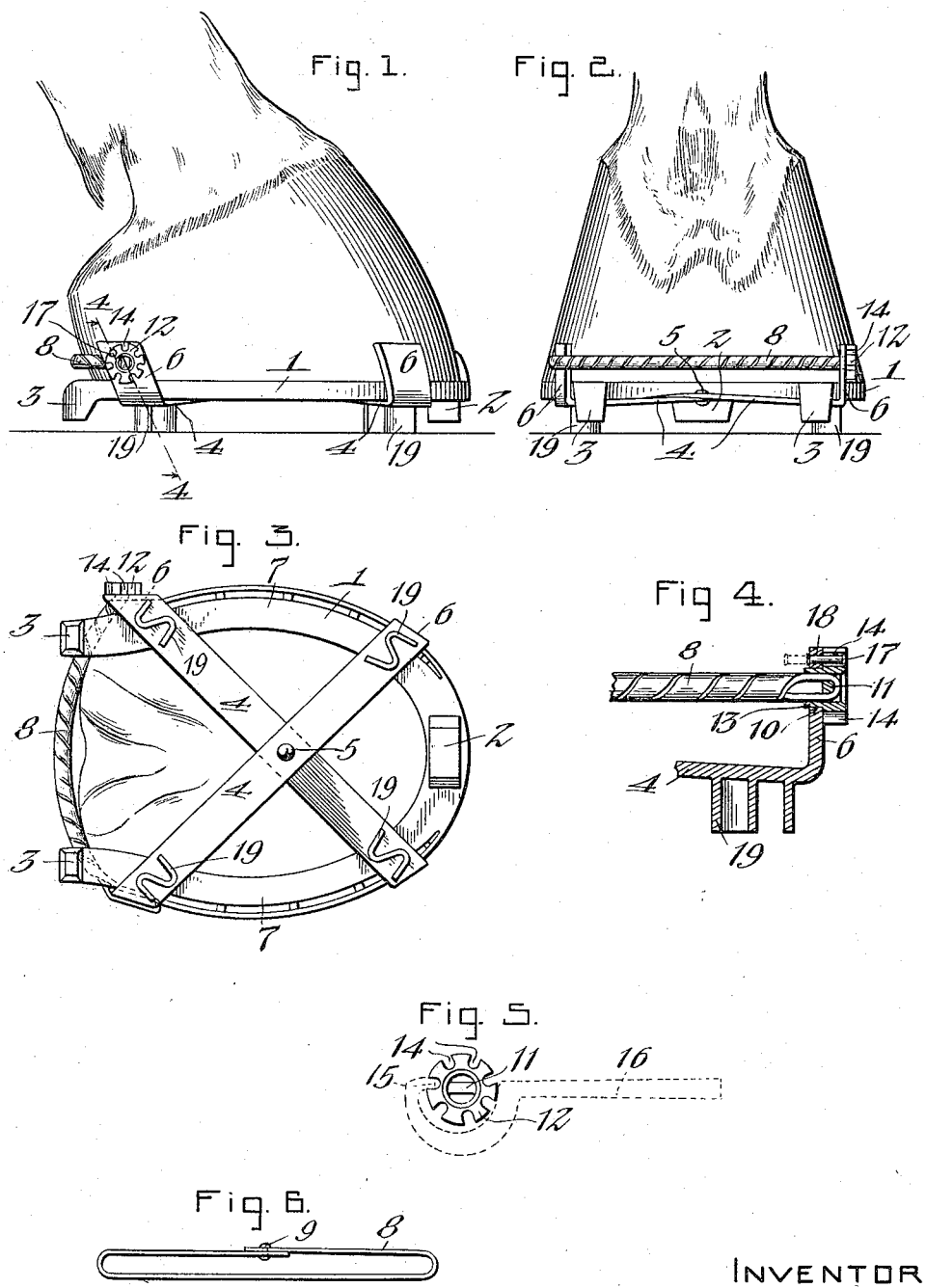

OSCAR E. BROWN, OF BUFFALO, NEW YORK.

DETACHABLE CALK-FRAME.

1,193,864.   Specification of Letters Patent.   Patented Aug. 8, 1916.

Application filed December 10, 1915. Serial No. 66,083.

*To all whom it may concern:*

Be it known that I, OSCAR E. BROWN, a citizen of the United States, residing at Buffalo, in the county of Erie and State of New York, have invented new and useful Improvements in Detachable Calk-Frames, of which the following is a specification.

This invention relates to overshoes or detachable calk-frames of the class which are adapted to be placed over ordinary horseshoes and provided with sharp calks to prevent slipping of the animal on wet or icy pavements.

The object of my invention is the improvement of the means for clamping the attachment to the horseshoe or the animal's hoof with a view of rendering the device light and reliable and also adjustable to shoes or hoofs of different sizes, to avoid the necessity and expense of manufacturing the attachment in a large number of sizes.

In the accompanying drawings: Figure 1 is a side elevation of the calk-attachment applied to a horse's hoof. Fig. 2 is a rear view thereof. Fig. 3 is a bottom plan view of the same. Fig. 4 is a fragmentary transverse section, on an enlarged scale, on line 4—4, Fig. 1. Fig. 5 is a detached side view of the twisting-wheel of the flexible connection. Fig. 6 is a top plan view of the flexible connection in its untwisted condition.

Similar characters of reference indicate corresponding parts in the several views.

In the drawings, the attachment is shown in connection with an ordinary horseshoe, but if desired, the same may be applied directly to an animal's hoof having no such shoe.

1 indicates the ordinary horseshoe which is nailed to the hoof in the customary way and which may be provided with dull calks, 2 indicating the toe-calk and 3 the heel-calks.

In the preferred construction shown in the drawings, the calk-frame or overshoe comprises a pair of crossed metallic bars 4 pivotally connected together at their intersection by a pin or rivet 5, so that the opposing front and rear arms thus formed may be adjusted toward and from each other to expand or contract the frame to fit different sized hoofs. The bars of this adjustable frame extend across the underside of the horseshoe or the bottom of the hoof when the shoe is omitted. The four arms of the frame are provided at their outer ends with upwardly-extending lugs or lips 6 adapted to overlap or bear against the sides of the horseshoe, these arms being of such length that the lugs of the front arms normally bear against the shoe in front of its widest or bulging portions 7, while the lugs of the rear arm bear against the shoe in the rear of said bulges, as shown in Fig. 3, whereby these bulging portions prevent both forward and rearward displacement of the frame on the shoe. Either the front or the rear arms of the crossed bars 4 are connected together and drawn toward each other by the improved clamping device shown in the drawings, for the purpose of tightly clamping the lugs of the arms against the sides of the horseshoe or the hoof and reliably retaining the calk-frame thereon. This clamping device is preferably applied to the rear arms of the frame, as shown, and comprises a flexible connection 8 of any suitable material having the required strength, this connection being securely attached at one end to the lugs 6 of one of the rear arms, while its other end passes through the lugs 6 of the opposing arm and is provided with twisting means for tightening it and locking means to prevent untwisting thereof. The preferred connection shown in the drawings consists of a continuous doubled thong having its ends riveted or otherwise secured together, as shown at 9 in Fig. 6, and looped at one end around one of the rear lugs 6. Its other end passes freely through an opening 10 in the opposite lug and embraces a cross bar 11 extending across the bore of a twisting wheel 12 which bears against the outer side of said apertured lug. The hub of this wheel has an inward extension 13 journaled in the opening 10 and forming a bushing which protects the adjacent portion of the thong from chafing and excessive wear. The twisting wheel 12 is provided in its periphery with notches 14 adapted to receive the pin or jaw 15 of a suitable wrench 16, shown by dotted lines in Fig. 5. Upon turning this wheel, the strands of the flexible connection 8 are twisted, thereby contracting the connection, drawing the rear arms of the calk-frame toward each other and simultaneously contracting its front arms, thus tightly clamping the lugs 6 against the sides of the shoe or the hoof. After thus twisting the clamping connection 8, the wheel 12 is locked in place by a sliding pin 17 arranged in a transverse opening 18 in the adjacent lug 6 and engaging with one of the notches of the wheel, as shown in Fig. 4. The ends of this pin are headed or upset to retain it in its guide opening in the lug. When it is desired to unlock the twisting wheel to release the clamping connection 8 and remove the overshoe, the pin 17 is driven inwardly far enough to clear the notch of the wheel, as shown by dotted lines in Fig. 4. The outer end of the guide-opening 18 is countersunk to receive the outer head of the pin and permit it to clear the wheel.

If desired, any other suitable means may be employed for locking the twisting-wheel. As shown in Fig. 3, the lug against which the twisting wheel bears is preferably arranged substantially parallel with the longitudinal axis of the shoe to avoid forming a sharp bend in the adjacent portion of the flexible connection. This connection while serving to fasten the calk-attachment securely to the horseshoe or hoof, adapts itself to the curvature of the back of the hoof or its position relative to the rear lugs 6 of the attachment, thereby compensating for variations in the size and shape of different hoofs and enabling the same attachment to be applied and adjusted to different-sized hoofs and horseshoes. The device has the advantage over a clamping screw that it is not liable to be loosened by the jars or vibrations of the overshoe, nor to become bound, which is liable to occur with a screw or a nut by rusting or becoming battered. This improved connection is also superior to a strap and buckle connection in that it has no lost motion and always remains tight.

The intersecting bars 4 are provided on the underside of their end portions with sharp calks 19 of any suitable construction. They are preferably corrugated or approximately S-shaped, as shown in Fig. 3 and of substantially uniform thickness throughout their depth, as shown in Fig. 4. By this construction, they present a number of non-slipping edges arranged at different angles and they will last a long time and maintain a sharp edge until worn off. While presenting such edges, the calks have a comparatively large tread; as they have no sharp angles, snow or dirt cannot lodge or pack therein and clog them.

I claim as my invention:

1. A detachable calk-frame having bars which are adjustable toward and from each other and provided with means arranged to engage a horseshoe or hoof, and a clamping device connecting opposing ends of said frame-bars and comprising a flexible member attached at one end to one of said bars, twisting means applied to the other end of said member, and means for locking said twisting means.

2. A detachable calk-frame having bars which are adjustable toward and from each other and provided with lugs, a clamping device comprising a flexible connection attached at one end to one of said lugs and having its other end passed through the opposite lug, a twisting wheel secured to the last-named end of said connection, and means for locking said twisting-wheel in place.

3. A detachable calk-frame having bars which are adjustable toward and from each other and provided with lugs, a clamping device comprising a flexible connection attached at one end to one of said lugs and having its other end passed through the opposite lug, a twisting-wheel secured to the last-named end of said connection and provided with locking notches, and a sliding locking pin mounted on the adjacent lug and arranged to engage said notches.

4. A detachable calk-frame having bars which are adjustable toward and from each other and provided with lugs, a flexible connection comprising a continuous doubled strip fastened at one end to one of said lugs and having its other end arranged in an opening in the opposite lug, a twisting-wheel bearing against the last-named lug and provided with a cross bar around which said strip is looped, and means for locking said twisting-wheel.

5. A detachable calk-frame having bars which are adjustable toward and from each other and provided with lugs, one of said lugs having an opening, a twisting-wheel having a bushing extending into said opening, a flexible connection passing through said bushing and attached to said twisting-wheel, the other end of the connection being attached to the opposite lug, and means for locking said twisting-wheel.

6. A detachable calk-frame having bars which are adjustable toward and from each other and provided with lugs, a flexible connection attached at one end to one of the rear lugs of said frame and having its other end passed through the opposite rear lug, a twisting device secured to the last-named end of the connection and bearing against the adjacent lug, and means for locking said twisting device.

7. A detachable calk-frame having bars which are adjustable toward and from each other and provided with means arranged to engage a horseshoe or hoof, and a clamping device comprising a flexible member attached at its ends to opposing portions of said frame-bars and twisting means applied to said flexible member.

OSCAR E. BROWN.

Copies of this patent may be obtained for five cents each, by addressing the "Commissioner of Patents, Washington, D. C."